United States Patent
Hoskin et al.

(10) Patent No.: US 7,302,405 B2
(45) Date of Patent: Nov. 27, 2007

(54) METHODS FOR MANAGING AND DEVELOPING SOURCING AND PROCUREMENT OPERATIONS

(75) Inventors: Glenn W. Hoskin, Decatur, GA (US); Vivek Soneja, East Stroudsburg, PA (US); John Zagata, Morristown, NJ (US)

(73) Assignee: Accenture Global Services GmbH, Schaffhausen (CH)

( * ) Notice: Subject to any disclaimer, the term of this patent is extended or adjusted under 35 U.S.C. 154(b) by 671 days.

(21) Appl. No.: 10/367,790

(22) Filed: Feb. 19, 2003

(65) Prior Publication Data

US 2004/0162763 A1    Aug. 19, 2004

(51) Int. Cl.
*G06Q 30/00* (2006.01)
*G06F 17/30* (2006.01)

(52) U.S. Cl. .............................. 705/26; 705/1; 705/10; 705/27

(58) Field of Classification Search .................... 705/1, 705/10, 26–27
See application file for complete search history.

(56) References Cited

U.S. PATENT DOCUMENTS

| | | | | |
|---|---|---|---|---|
| 5,799,289 | A | * | 8/1998 | Fukushima et al. ......... 705/400 |
| 6,064,981 | A | * | 5/2000 | Barni et al. .................... 705/26 |
| 6,115,690 | A | * | 9/2000 | Wong ............................. 705/7 |
| 6,910,018 | B1 | * | 6/2005 | Okada et al. .................. 705/26 |
| 2002/0007302 | A1 | * | 1/2002 | Work et al. .................... 705/10 |
| 2002/0082953 | A1 | * | 6/2002 | Batham et al. ................ 705/27 |
| 2002/0133368 | A1 | * | 9/2002 | Strutt et al. ..................... 705/1 |
| 2002/0143692 | A1 | * | 10/2002 | Heimermann et al. ........ 705/37 |
| 2003/0120528 | A1 | * | 6/2003 | Kruk et al. ..................... 705/7 |
| 2004/0098292 | A1 | * | 5/2004 | Miller et al. ................... 705/8 |

FOREIGN PATENT DOCUMENTS

JP 406351161 A * 12/1994
WO WO 00/46687 * 8/2000

OTHER PUBLICATIONS

Anonymous "Exclusive interview: Tom Kress". Aftermarket Business. Cleveland, OH. Feb. 2001. vol. 111, Iss. 2; p. S12, 3 pgs. [recovered from Proquest Database Mar. 13, 2006].*
Greis, Noel. Kasarda, John. "Enterprise logistics in the information era". California Management review. 1997. [recovered from Dialog database May 21, 2007].*
Bannan, Karen J. "The pulse of the supply chain", Internet World/. Jan. 2003 [recovered from Dialog database May 21, 2007].*

* cited by examiner

*Primary Examiner*—Matthew S. Gart
*Assistant Examiner*—William J. Allen
(74) *Attorney, Agent, or Firm*—Hogan & Hartson LLP (57) ABSTRACT

Disclosed is an accelerated sourcing and procurement framework for developing and managing procurement operations. The sourcing and procurement framework, includes sourcing, contracting, vendor management, back office operations, and performance reporting, and can be combined with the management of the physical flow of good. The present invention provides for compliance with specific rules or regulations, includes the strategic, operational and financial components of procurement, can be implemented on an accelerated timeframe, develops a single procurement source, and is formulated in a manner that allows for complete or partial outsourcing.

22 Claims, 8 Drawing Sheets

METHODS FOR MANAGING AND DEVELOPING SOURCING AND PROCUREMENT OPERATIONS

BACKGROUND OF THE INVENTION

1. Field of the Invention

The present invention relates to a sourcing and procurement framework for developing a procurement infrastructure. Specifically, the present invention provides a sourcing and procurement framework that is compliant with applicable rules and regulations, can be implemented within an accelerated timeframe, incorporates a procurement source database, and can be managed from a central outsourced entity.

2. Discussion of the Related Art

Sourcing and procurement operations are common in the development of a business or business operations. These operations are traditionally accomplished by various entities with distinct responsibilities pertaining to specific elements of the sourcing and procurement process.

Due to the involvement of multiple entities within a traditional sourcing and procurement solution, information and understanding that is gained during a particular stage of the solution may be lost or diluted as responsibilities are transferred to the next stage or entity involved in the solution. Likewise, management for the next responsible entity must glean what information it can from the previous stage in order to effectively manage business relationships that have been developed. Furthermore, specialists that exist within the previous entity or that may have been developed from their experience in the previous entity may be lost due to the transfer of responsibilities to a subsequent entity or entities.

These and other deficiencies exist in current sourcing and procurement solutions. Therefore, a solution to these problems is needed, providing an improved sourcing and procurement solution.

SUMMARY OF THE INVENTION

Accordingly, in view of these and other deficiencies inherent in current sourcing and procurement solutions, the present invention is directed to an integrated sourcing and procurement solution providing enhanced management capabilities from a single entity, speed of implementation, and a centralized data source. The centralized management allows experience and expertise incorporated or developed throughout the solution, including knowledge regarding specific regulations, rules, or laws, to be retained throughout the task sets of the solution.

The present invention provides a framework for a sourcing and procurement team to provide sourcing and procurement activities for a client. The sourcing and procurement team may be wholly outsourced, wholly maintained within the client organization, or divided according to a client's interests. According to the present invention, the sourcing and procurement team provides a focal point for sourcing and procurement activities and allows the maintenance of experience and expertise to remain throughout the task sets of the solution.

The structure and centralized management of the present invention also provides for speed in the implementation of the solution. A centralized catalog or catalogs are also created throughout the solution in order to provide a single procurement source that simplifies the procurement process.

In one embodiment, the present invention provides a sourcing and procurement framework for developing and managing procurement operations in an accelerated manner. The framework includes developing and implementing a catalog of procurement items, as well as interrelated and interdependent business processes. The sourcing and procurement framework comprises a sourcing operations task set containing related tasks for developing a strategic overview of a client's spend profile, supplier base, supplier industry dynamics and cost of ownership models, a negotiation and contracting task set containing related tasks for developing contractual relationships with vendors, a managing vendors task set containing related tasks for developing enhanced vendor capabilities, a back office operations task set containing related tasks for managing the procurement of the procurement items, and a performance reporting task set containing related tasks for reviewing and reporting the performance of the vendors, a procurement team, or a client's spend activity.

A further embodiment of the present invention provides a sourcing and procurement method for developing and managing sourcing and procurement operations in an accelerated manner. The sourcing and procurement method includes developing and implementing a catalog of procurement items, as well as interrelated and interdependent business processes. The sourcing and procurement method comprises the steps of developing a strategic overview of a client's spend profile, supplier base, supplier industry dynamics and cost of ownership models, developing contractual relationships with vendors, developing enhanced vendor capabilities, managing the procurement of procurement items, and reviewing and reporting the performance of the vendors, a procurement team, or a client's spend activity.

Another embodiment of the present invention provides a method for providing outsourceable sourcing and procurement services, comprising the steps of developing a strategic overview of the organization's spend profile, supplier base, supplier industry dynamics and cost of ownership models, selecting vendors, developing contractual relationships with the selected vendors, creating a catalog of approved procurement items for procurement from the selected vendors, developing enhanced relationships with the selected vendors, managing the procurement of approved procurement items, reviewing the performance of the selected vendors, and reporting the performance of the selected vendors.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof, as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to various embodiments of the present invention, examples of which are illustrated in the accompanying drawings.

Figure 1:
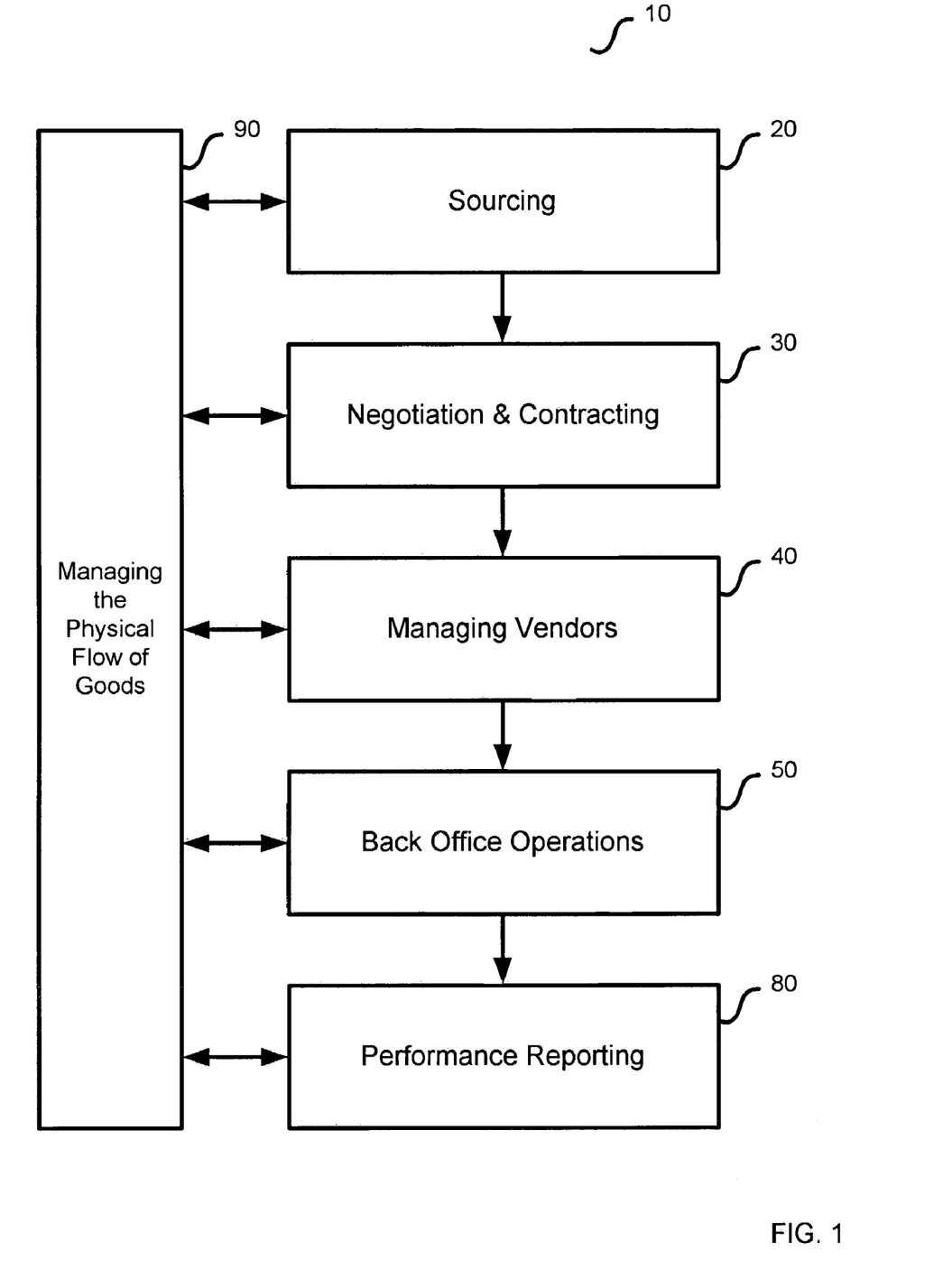
FIG. 1 shows the process flow of the sourcing and procurement framework according to an embodiment of the present invention.

FIG. 1 shows the process flow of the sourcing and procurement framework according to an embodiment of the present invention. As shown in FIG. 1, a sourcing and procurement framework 10 provides a start-to-finish solution for sourcing and procurement. The sourcing and procurement framework 10 includes a series of interrelated and interdependent processes that assist in the creation of a sourcing and procurement solution. The process flow of the sourcing and procurement framework 10 may include a sourcing task set 20, a negotiations and contracting task set 30, a managing vendors task set 40, a back office operations task set 50, and a performance reporting task set 80. The sourcing and procurement solution provided by the sourcing and procurement framework 10 allows for the ability to establish sourcing and procurement capabilities in a reduced timeframe with the ability to manage sourcing and procurement by a single entity.

In a further embodiment of the invention, a management of the physical flow of goods task set 90 may also be provided throughout the sourcing and procurement framework 10. The management of the physical flow of goods task set 90 provides a single conduit between suppliers and purchasers that is developed throughout the sourcing and procurement task sets.

An alternative embodiment of the present invention also allows one or more rules and regulations specialists the opportunity to monitor and ensure that all processes are compliant with applicable rules and regulations throughout the sourcing and procurement framework 10. Applicable rules and regulations may include federal laws, state laws, or any other business related law or rules.

Figure 2:
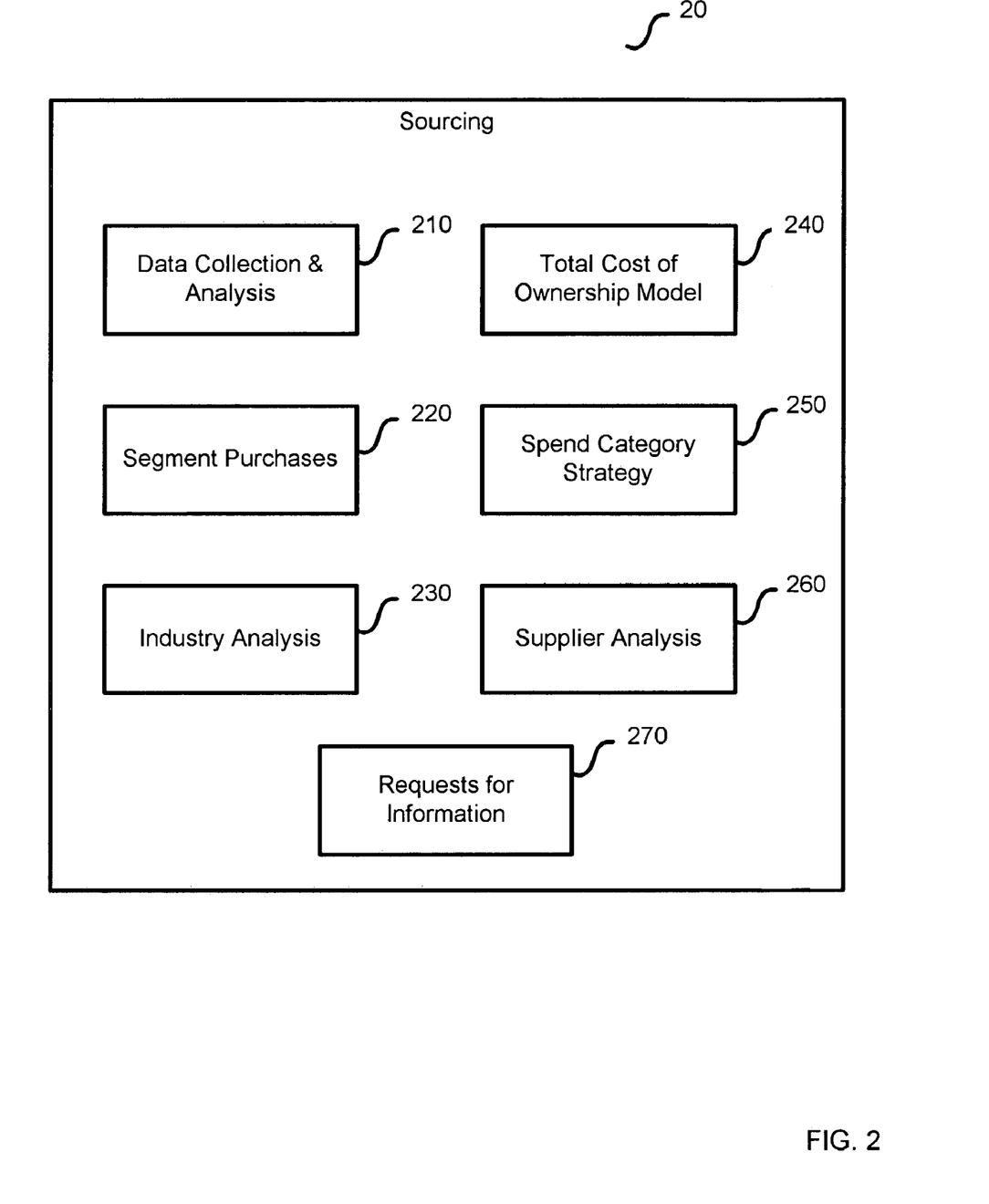
FIG. 2 shows the task options of the sourcing task set according to an embodiment of the present invention.

FIG. 2 shows in greater detail the task options available in the sourcing task set 20 of the sourcing and procurement framework 10. The task options of the sourcing task set 20 provide for the development of a strategic overview of an organization's spend profile, supplier base, supplier industry dynamics and cost of ownership models. The strategic overview allows a client or sourcing and procurement team to develop a starting point for understanding their current spend and supplier base, and develop new commodity strategies based on detailed knowledge of supplier capabilities, the competitive pressures impacting their suppliers, and the internal costs impacting each spend or commodity grouping. As shown in FIG. 2, during the sourcing task set 20, a series of sourcing task options to be followed include data collection and analysis 210, segment purchases 220, industry analysis 230, total cost of ownership modeling 240, spend category strategy 250, supplier analysis 260 and requests for information 270.

During the data collection and analysis task 210, the sourcing and procurement team collects and analyzes the spend data of an organization to determine the spend profile and spend dynamics. This analysis details the items that are procured, the quantities procured, item pricing and other transactional information. The client and sourcing and procurement team then evaluate the data to confirm the size of the client spend and develop an initial hypothesis of how the items will be grouped. This analysis provides a baseline of current spend and provides a guide to the segment purchases task 220.

The segment purchases task 220 provides for the analysis of procurement items to determine how to logically segment and group the current spend categories. The goal is to create commodity categories to combine like items into large groupings, when possible, to help with maximizing leverage when negotiating with vendors. By maximizing the purchase of similar items from the same vendor, a client is generally able to negotiate better pricing and service levels from that vendor than if individual items are purchased from multiple vendors. A further embodiment of the present invention provides for assigning individuals from the sourcing and procurement team to manage specific commodity segments within the segment purchases task 220.

During the industry analysis task 230 efforts are made to gain knowledge regarding the industry competitive pressures impacting key supply markets of the commodities to be sourced. This knowledge is used to help determine the best grouping of commodities, assist with supplier negotiation and develop deeper understanding of the commodities to be sourced. Efforts are made to know such things as the competitive pressures within an industry to include the relative strength of buyers and suppliers, barriers to entry, the viability of potential substitute products and/or services and the profit margins for particular products or commodity segments.

The total cost of ownership model task 240 provides for the determination of the total expected costs to procure a given item. Total costs include, for example, such expenses as the price of the item, the available speed of delivery, the costs associated with the ability to design and develop an item, warehousing and logistics costs, and the cost of internal process and operations.

Spend category strategy task 250 includes analysis of a client's business needs, the likely benefit to be derived from sourcing a particular commodity and the ease with which a given commodity benefit can be achieved. This analysis will assist with determining what the sourcing strategy will be for each commodity and how the sourcing efforts for each commodity grouping will be sequenced.

The supplier analysis task 260 is the research that ensures that a given supplier is a person or entity with whom a client would want to do business. A given supplier's financial health, past performance, and reputation may be reviewed. By studying a supplier's overall capabilities and financial stability, it can be determined whether or not that supplier should be given future consideration.

The request for information task 270 provides for the submission of requests for information to potential vendors. Requests for information 270 are provided to vendors to gather more detailed information regarding a product or potential product to determine if that vendor is capable of providing or designing a specific product or products, what the item pricing will be, delivery and payment terms, quality guarantees, etc.

Figure 3:
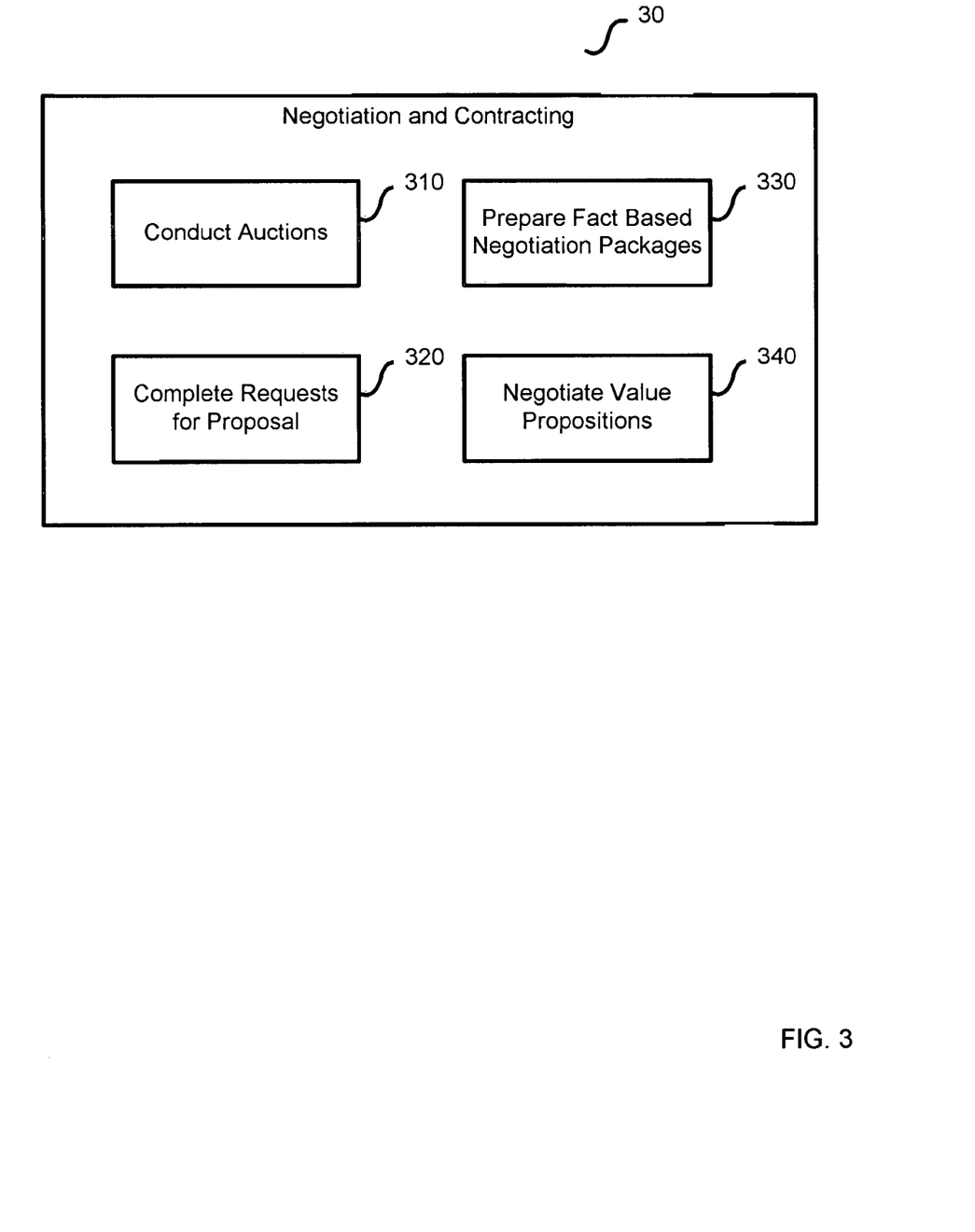
FIG. 3 shows the task options of the negotiation and contracting task set according to an embodiment of the present invention.

FIG. 3 shows in greater detail the task options available in the negotiation and contracting task set 30 of FIG. 1. The negotiation and contracting task set 30 provides for the development of contractual relationships with vendors identified during the sourcing task set 20. During the negotiation and contracting task set, the items to be procured and which vendors will provide those items are determined. One embodiment of the present invention also includes review of the various negotiation and contracting tasks by one or more rules and regulations specialists in the sourcing and procurement team assigned to the negotiation and contracting task set 30. The task options of the negotiation and contracting task set 30 include conducting auctions 310, completing requests for proposals 320, preparing fact based negotiation packages 340, and negotiating value propositions 350.

The conduct auctions task 310 provides for the creation of an on-line auction for obtaining bids from vendors for specified items listed in the auction. The auction provides the item or items a client wishes to procure and provides the ability for vendors to post bids and monitor information regarding the current winning bid. Through this type of bidding process a sourcing and procurement team may obtain improved pricing for a client by encouraging competition between vendors.

A complete requests for proposal task 320 is also available during the negotiation and contracting task set 30. Requests for proposal are provided to vendors to solicit bids for items and services. After responses are received from the vendors, selection of an appropriate vendor or vendors can be made.

In the prepare fact based negotiation packages task 330 materials are prepared for negotiations with identified vendors. The materials and information assembled during the sourcing task set 20 and the negotiation and contracting task set 30 shown in FIG. 1 are organized to assist in the development of negotiation strategy. These materials enable the sourcing and procurement team to identify the strengths and weaknesses in their negotiation position, as well as determine what additional services or requirements may be beneficial with regard to a specific vendor. For example, the ability of a vendor to easily report the status of an order by providing on-line status access may be a key capability required of a given vendor.

The negotiate value propositions task 340 defines the actual negotiations between the sourcing and procurement team and a vendor. At this stage, pricing, delivery capabilities, response times, and other value to the project are negotiated. During this task, the complete capabilities and pricing of a vendor's services and products are determined and agreed to.

As discussed previously, an embodiment of the present invention may include review by one or more rules and regulations specialists to ensure that all applicable rules and regulations are followed throughout the sourcing and procurement framework 10 of FIG. 1. As an example of the use of such a specialist during the negotiation and contracting task set 30, requests for proposal, in some instances, must follow strict regulations with respect to the types of vendors included in the request process, such as minority owned businesses. In this example a specialist monitors the request for proposal process to ensure that all rules and regulations with regard to opportunities for minority owned businesses are followed. By monitoring the adherence to applicable rules and regulations the likelihood of a violation is minimized. Thus, fines, investigations or other delays may be eliminated.

Figure 4:
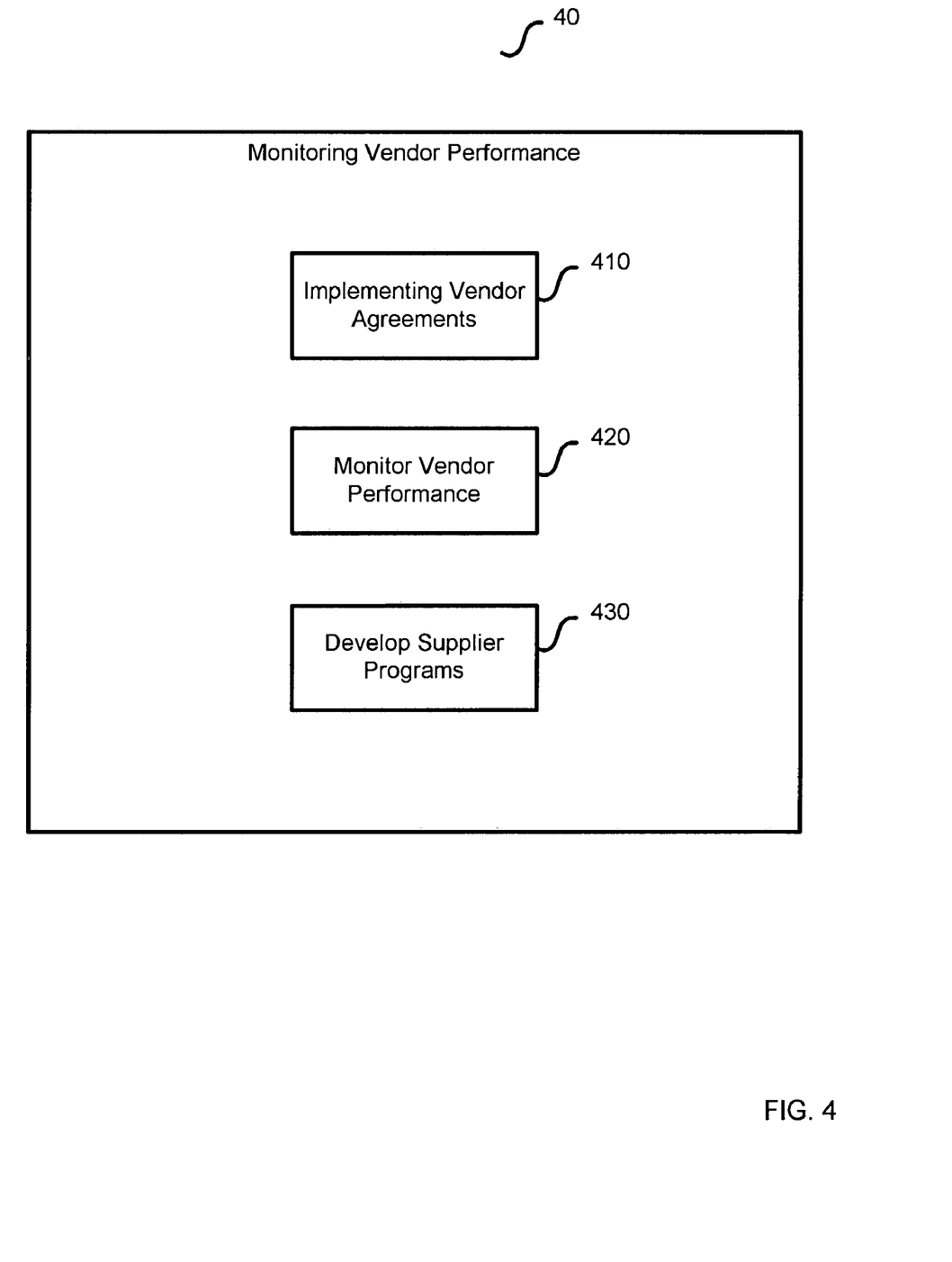
FIG. 4 shows the task options of the managing vendors task set according to an embodiment of the present invention.

FIG. 4 shows in greater detail the tasks available in the managing vendors task set 40 shown in FIG. 1. In the managing vendors task set 40, the relationships with the various vendors that are selected to provide items and services are developed. This task set ensures quality vendor relationships are maintained and enables the monitoring of delivery capabilities of a vendor, quality of a vendor's products and services, and invoicing procedures. The activity options of the managing vendor performance task set 40 of FIG. 1 may include implementing vendor agreements 410, monitoring vendor performance 420, and developing supplier programs 430.

The implementing vendor agreements task 410 ensures that the new vendor contractual relationship is implemented for the entire client organization. This includes: ensuring all client personnel order from the new vendor contract, confirming order management processes, verifying all client usage and delivery locations, enforcing contract compliance across all client business units and eliminating all off-contract purchasing.

The monitoring vendor performance task 420 enhances the sourcing and procurement team's ability to ensure quality of vendors and products. By monitoring performance, problems or potential problems can be resolved early or avoided altogether, ultimately saving time and money.

Within the monitoring vendor performance task 420, the order status of each order submitted is monitored. Monitoring may be done through on-line ordering systems, or through manual reviews, such as using tracking information from shipments. Performance monitoring also includes tracking on-time delivery, quality issues, the ability to integrate with client operations and business needs, and other criteria. Performance is also monitored with a vendor by addressing the pros and cons of a vendor's performance on a regularly scheduled basis and providing prompt, accurate feedback.

In a further embodiment of the present invention, supplier programs task 430 may also be developed to reward trusted vendors that are exceeding expectations. Programs may also provide incentives for a vendor to continue to develop and enhance value add services provided to the organization. These programs are based on a vendor's history of performance and to encourage enhanced performance in the future.

Figure 5:
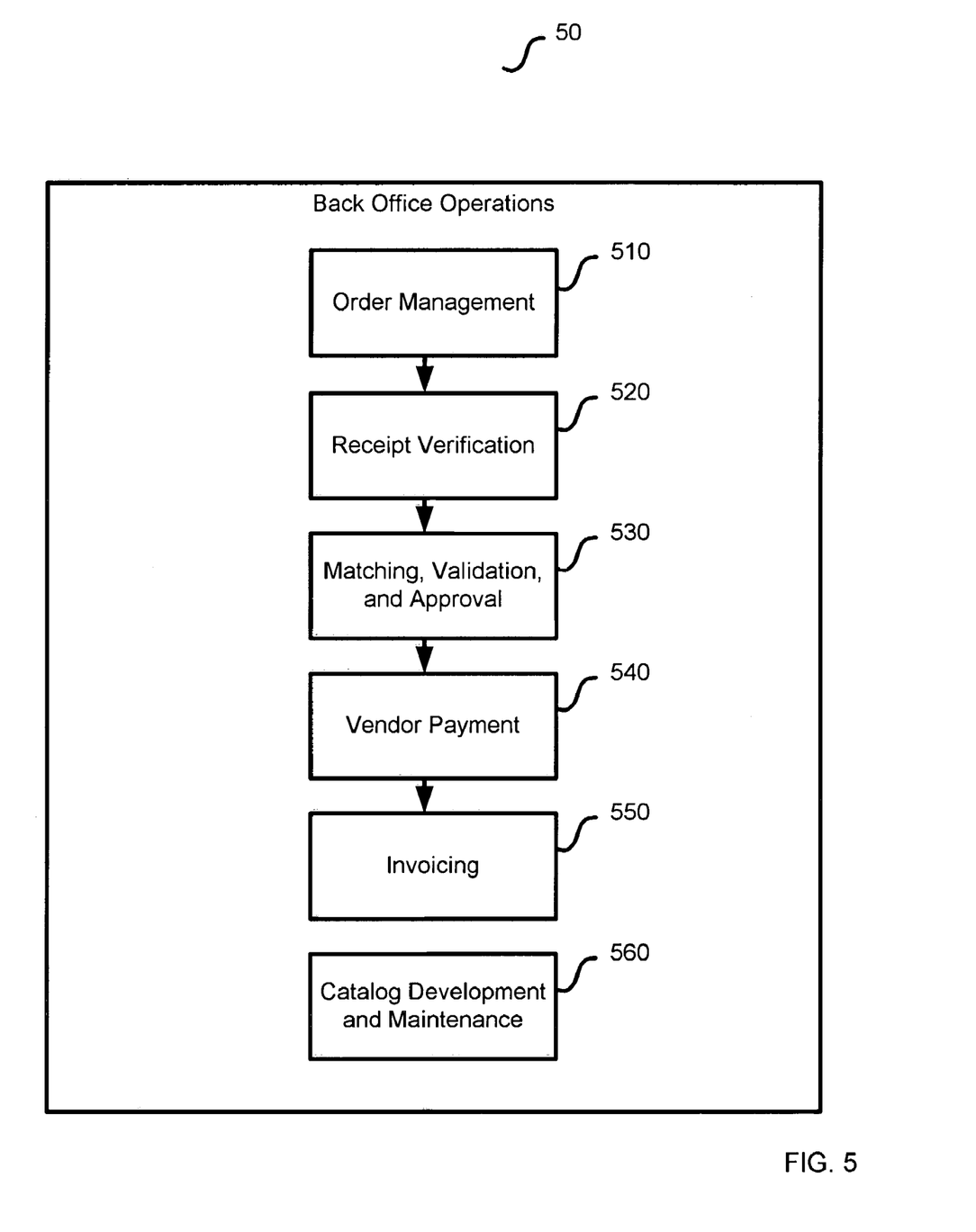
FIG. 5 shows the task options of the back office operations task set according to an embodiment of the present invention.

FIG. 5 shows in greater detail the activity options available in the back office operations task set 50 of FIG. 1 that ensure proper management of the procurement of available items. The back office operations task set 50 provides the procurement processes within the sourcing and procurement framework 10. Within this task set, orders are made and processed according to the present invention. The task options of the back office operations task set 50 include order management 510, receipt verification 520, matching, validation, and approval processes 530, vendor payment 540, invoicing 550, and catalog development 560.

The order management task 510 provides the processes necessary for ordering an item from a catalog to ensure that an approved item is procured from an approved vendor and ensures that the order is captured in the vendor order management system and then tracks vendor order fulfillment.

The receipt verification task 520 ensures that items included in an approved order are received by the project. A project employee may prepare receiving documents verifying what items a vendor delivered or record the receipt electronically. The receiving documents are submitted to the sourcing and procurement team for review. Alternatively, a system may be deployed to alert the team to any receipt verification exceptions.

The matching, validation, and approval task 530 ensures the accuracy in the payment of invoices for received goods. Approvals are made only after the records of an order are matched, and validated.

The vendor payment task 540 provides for payment to a vendor by the sourcing and procurement team only after an approval is completed. In an alternative embodiment of the present invention, a financial management group may be assigned to review the approval and make the payment to the vendor. Electronic capabilities may be deployed to help automate payment processing.

The invoicing task 550 provides for reimbursement for payments made to vendors. The client is invoiced on a regular basis for reimbursement to the sourcing and procurement team for any payments made to vendors for goods or services. In one embodiment of the present invention, a financial management group processes the invoicing 550. In a further embodiment of the present invention, the invoicing task 550 may also include a review to ensure that all rules and regulations are followed.

The catalog development and maintenance task 560 is also available in the back office operations task set 50 of FIG. 1. Any catalogs that are developed throughout the sourcing and procurement solution of the present invention are regularly reviewed to ensure accuracy of the information they contain. Various embodiments of the present invention provide for the development and maintenance of catalogs with varying degrees of detail, such as photographs of the items, prices, descriptions, etc. Catalogs may also be accessible over the Internet or locally available in softcopy or printed versions.

Figure 6:
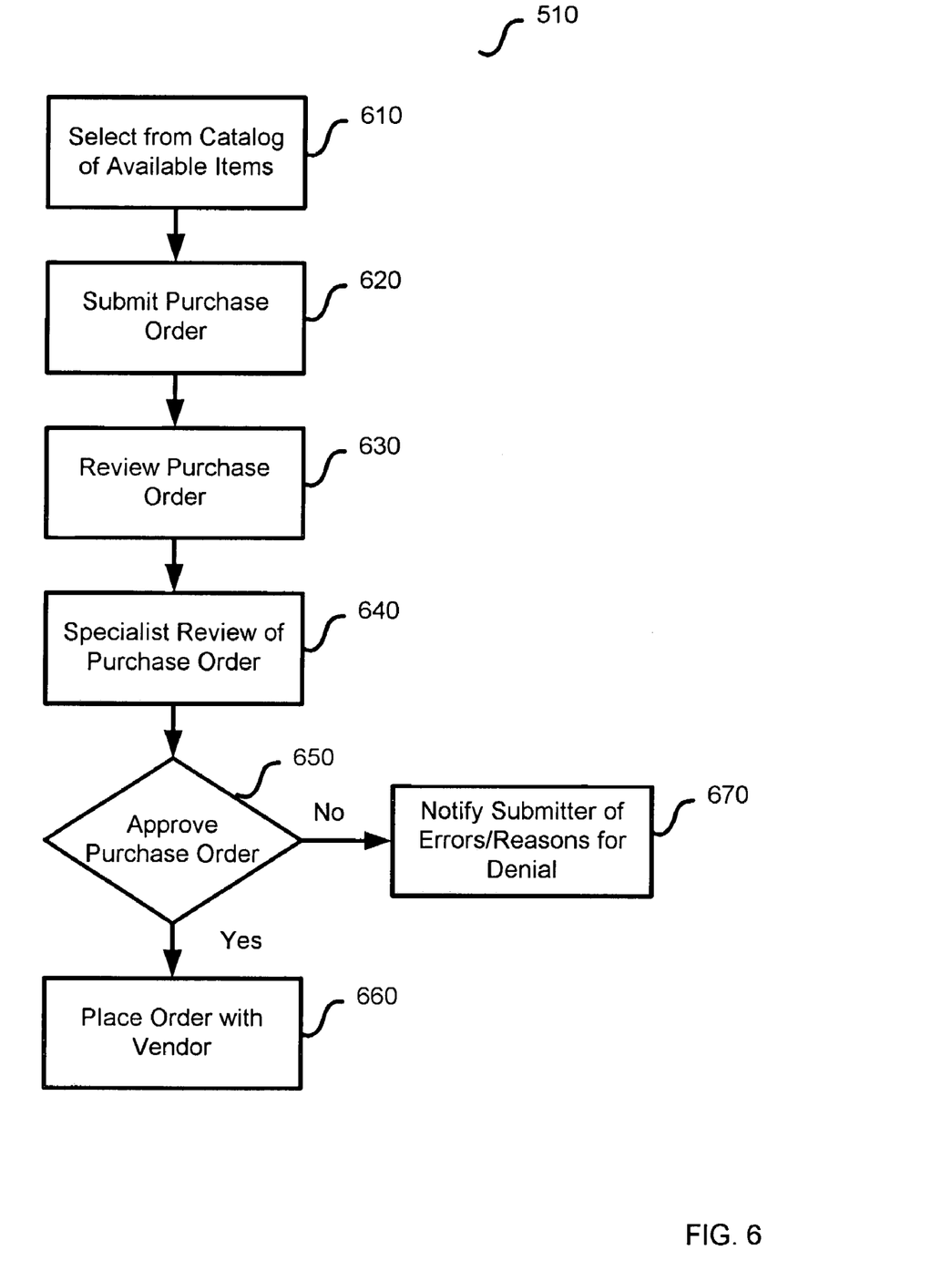
FIG. 6 shows the detail flow of order management according to an embodiment of the present invention.

In FIG. 6, the processes for carrying out the order management task 510 of FIG. 5 are described in greater detail. The process begins at step 610 where a project employee reviews a catalog of available items and selects an item or items. The process then moves to step 620 where an employee, after receiving the appropriate approvals, submits a purchase order to the sourcing and procurement team. The sourcing and procurement team reviews the purchase order in step 630 to ensure that it is properly prepared. In a further embodiment, a specialist reviews the purchase order in step 640 to ensure that it meets any applicable rules and regulations.

In step 650 the team members reviewing the purchase order then approve or reject the purchase order. If a purchase order is approved, the order will be placed with the appropriate vendor or vendors for purchase of the identified items in step 660. Alternatively, if the purchase order is rejected, the person submitting the purchase order is notified of the deficiencies or errors of the purchase order in step 670. The employee may correct and resubmit the purchase order or simply submit a new purchase order. System tools may also be deployed to help automate this process.

By ordering through the sourcing and procurement team each purchase order is reviewed ensuring that only approved items have been requested and that proper procedures have been followed. The sourcing and procurement team will also have established relationships with a vendor's account representative ensuring that the order is handled according to the previously agreed upon procedures. The sourcing and procurement team will also be able to track status and effectively communicate lead times for scheduled orders. Status of an order may also be checked through on-line sources or speaking directly with a vendor.

Placing orders in this manner provides a consistent relationship between a project and vendors, as well as a cost effective manner in which to purchase approved items. Furthermore, by reviewing a purchase order prior to submission to a vendor reduces the chances that an improperly submitted order is processed. Controlling the procurement process in this manner increases efficiency and reduces costs associated with improperly submitted orders.

Figure 7:
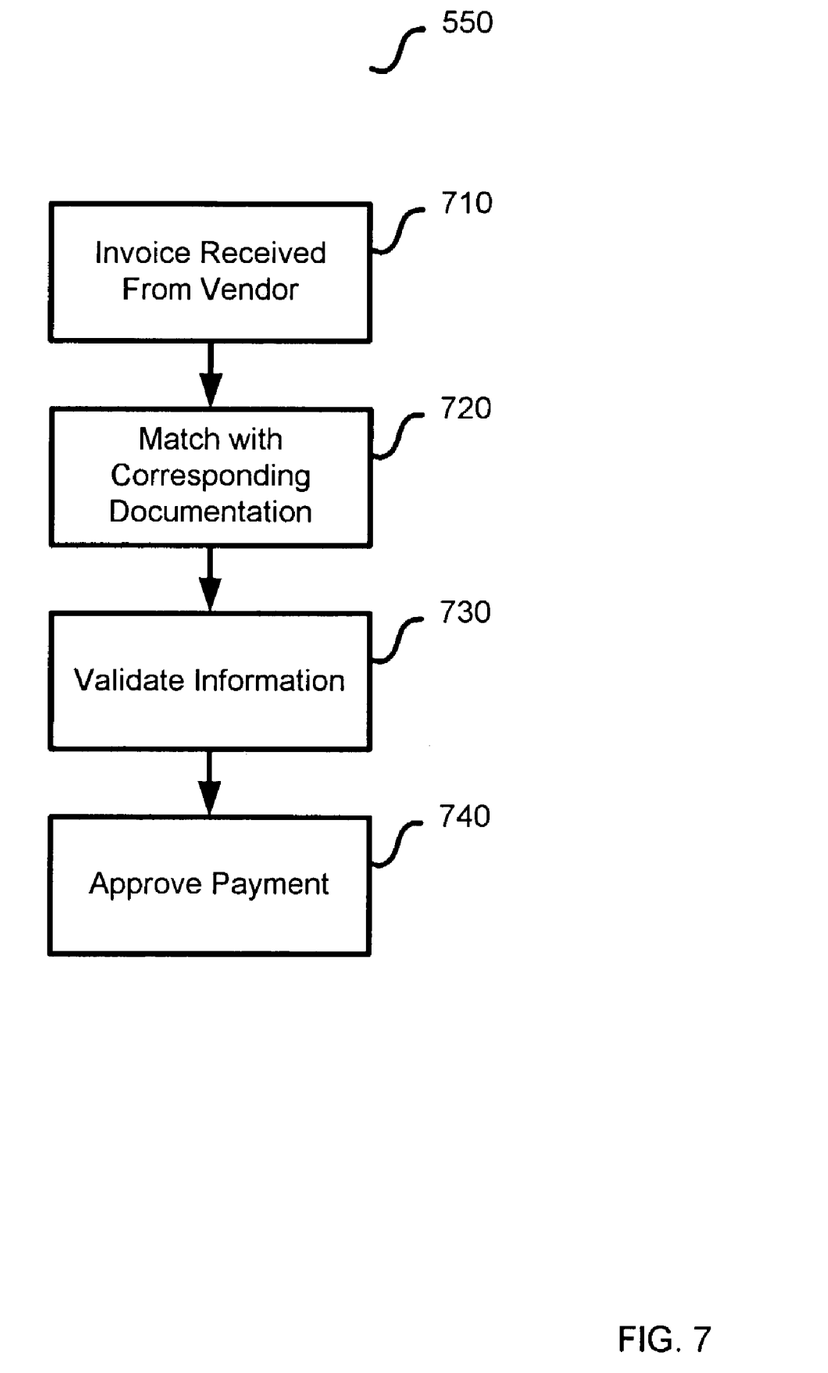
FIG. 7 shows the detail flow of receipt verification according to an embodiment of the present invention.

The processes of the matching, validation, and approval task 530 of FIG. 5 are shown in FIG. 7. Turning specifically to FIG. 7, the sourcing and procurement team receives from a vendor an invoice for ordered and delivered items in step 710. The vendor's invoice is then matched against the corresponding purchase order and against the corresponding receiving documents in step 720. Matching the various records ensures that all information, such as the price, quantity, vendor, etc., is consistent and accurate among the records.

The sourcing and procurement team may also validate the information contained within the documents in step 730. Validation may include such reviews as comparing the pricing information of the order with the contract entered into with that vendor to ensure that proper prices were used in conjunction with that particular order.

Once an invoice has been matched and validated, payment is approved in step 740 by authorizing the sourcing and procurement team to pay the vendor for the goods or services provided. After approval, a payment is then made to the vendor.

Figure 8:
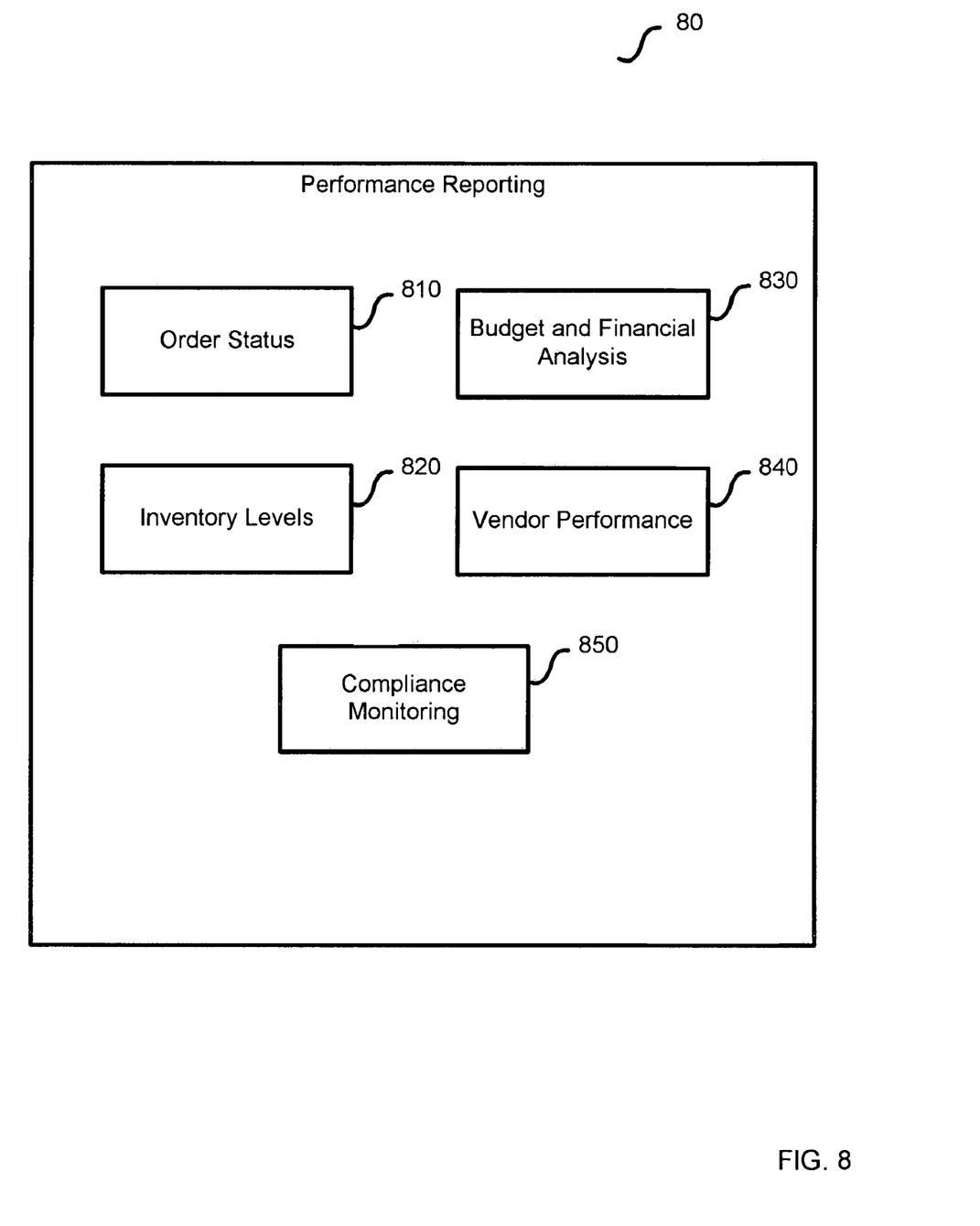
FIG. 8 shows the task options of the performance reporting task set according to an embodiment of the present invention.

FIG. 8 shows in greater detail the tasks available in the performance reporting task set 80 of FIG. 1. The task options of the performance reporting task set 80 provide for reviewing and reporting the performance of the vendors and the budget and financial status of procurement activities. As shown in FIG. 8, the task options available in the performance reporting task set 80 include order status 810, inventory levels 820, budget and financial analysis 830, vendor performance 840, and compliance monitoring 850.

The order status task 810 includes the regular review of current outstanding orders. In one embodiment the order status task 810 provides for the review of current outstanding orders twice a week. Further embodiments may schedule review of current outstanding orders based on preferred delivery schedules or other criteria.

The inventory levels task 820 is the regular review and reporting of inventory levels of previously procured items. All non-consumable items are inventoried and an inventory report is generated. In one embodiment, the inventory levels task 820 provides for the reporting of inventory levels on an annual basis. In a further embodiment of the present invention, the inventory report is created according to, and reviewed for compliance with, any applicable rules or regulations.

The budget and financial analysis task 830 is the reporting of the procured items against the budget assigned to a particular project. A report generated during the budget and financial analysis task 830 may be provided to the client for review.

The vendor performance task 840 is an opportunity to review performance issues with vendors. Any issues that may have arisen with a vendor are reported to and discussed with the vendor. Addressing vendor performance allows the sourcing and procurement team to make corrections before a serious issue arises. Thus, the expense of a serious problem is likely to be avoided.

The compliance monitoring task 850 is to ensure that procurement of items takes place through the approved procurement process. Reviewing and ensuring that client employees are adhering to the approved procurement process and contracts ensures that items will be procured from the appropriate vendors at the contracted prices.

Returning to FIG. 1, the managing the physical flow of goods task set 90 is also provided within an embodiment of the sourcing and procurement framework 10. The managing the physical flow of goods task set 90 allows the sourcing and procurement team to provide warehousing and logistics services to the client if the vendor does not possess these capabilities. In the embodiments discussed earlier, a client orders items from the catalog by providing a purchase order directly to the sourcing and procurement team. The sourcing and procurement team then orders the item from the vendor and the vendor delivers the item.

In an embodiment including a managing the physical flow of goods task set 90, the client orders from the sourcing and procurement team in the same manner as discussed above; however, the sourcing and procurement team is also responsible for delivering the item to the project. In these circumstances, the sourcing and procurement team orders and receives delivery of the items from a vendor and then delivers the items to the client. The sourcing and procurement team may even inventory items, specifically long lead-time items, for delivery when procured by a client.

By creating an inventory of certain items, the sourcing and procurement team can ensure that these items are available for delivery at all times. This is particularly useful with certain custom or bulk purchase items that are more easily purchased in quantities. The managing the physical flow of goods task 90 also provides the sourcing and procurement team with the ability to more closely manage the delivery of items to the project.

It will be apparent to those skilled in the art that various modifications and variations can be made in the present invention without departing from the spirit or scope of the invention. Thus, it is intended that the present invention cover the modifications and variations of this invention provided that they come within the scope of any claims and their equivalents.

The invention claimed is:

1. A sourcing and procurement method for developing and managing sourcing and procurement operations of an organization in an accelerated manner, the sourcing and procurement method comprising the steps of:
   creating a set of procurement items and a set of selected vendors, where the procurement items are the items requiring procurement by the organization and the selected vendors together are capable of supplying the set of procurement items,
   wherein, the step of creating a set of procurement items and a set of selected vendors further comprises developing a strategic overview of the organization's spend profile, supplier base, supplier industry dynamics and cost of ownership models;
   analyzing the procurement items, the spend profile, and spend dynamics to determine a segmentation of purchases of the procurement items, where the segmentation of purchases categorizes the procurement items into groups of similar items, each group being supplied by a single vendor;
   developing new contractual relationships with the selected vendors based on, at least, a vendor's capabilities and pricing;
   managing the selected vendors, this step further comprising the step of monitoring vendor performance;
   managing the procurement of procurement items from the selected vendors, where the procurement of procurement items is performed by a procurement team; and
   reviewing and reporting the performance of at least one of: the contracted vendors, the procurement team, or the organization's spend activity.

2. The sourcing and procurement method of claim 1, further comprising reviewing the sourcing and procurement operations for compliance with applicable rules and regulations by a rules and regulations specialist.

3. The sourcing and procurement method of claim 1, wherein the step of developing a strategic overview further comprises the steps of:
   collecting and analyzing the spend data of the organization to determine the spend profile and the spend dynamics, this step further comprising creating a set of procurement items;
   for each segment of the segmentation of purchases, analyzing competitive pressures impacting the supply markets of the procurement items in the segment;
   for each procurement item, determining a total cost of ownership to procure the item;
   for each procurement item, analyzing the organization's business need associated with the item;
   for each segment, determining a set of potential vendors of the procurement items in the segment;
   for each potential vendor, analyzing the capabilities and financial stability of the potential vendor; and
   creating a set of selected vendors from the potential vendors in accord with the analysis of competitive pressures, the total cost of ownership of the procurement items, the organization's business need associated with the procurement items, and the capabilities and financial stability of the potential vendors.

4. The sourcing and procurement method of claim 1, wherein the step of developing contractual relationships with vendors further comprises the steps of: submitting a request for proposal to a vendor; preparing fact based negotiations packages; and negotiating value propositions.

5. The sourcing and procurement method of claim 4, wherein the step of developing contractual relationships with vendors further comprises the step of conducting on-line auctions to obtain bids from vendors.

6. The sourcing and procurement method of claim 1, wherein the step of managing the selected vendors further comprises the step of implementing vendor agreements.

7. The sourcing and procurement method of claim 6, wherein the step of managing the selected vendors further comprises the step of developing supplier programs to encourage enhanced vendor performance.

8. The sourcing and procurement method of claim 1,wherein the step of monitoring vendor performance further comprises reviewing delivery performance, quality and pricing of the vendor.

9. The sourcing and procurement method of claim 1, wherein the step of managing the procurement of procurement items further comprises the steps of: managing orders made from a catalog of approved procurement items; verifying receipt of approved orders; approving orders; paying vendors for approved orders; invoicing a client for payments made; and maintaining a catalog of approved items.

10. The sourcing and procurement method of claim 9, wherein the step of managing orders made from a catalog of approved items further comprises the steps of:

selecting by a submitter an item from the catalog of approved procurement items; submitting by the submitter a purchase order for the item; and reviewing the purchase order.

11. The sourcing and procurement method of claim 10, wherein the step of managing orders made from a catalog of approved procurement items further comprises the steps of:

approving the purchase order; and placing an order for the item with a vendor.

12. The sourcing and procurement method of claim 10, wherein the step of reviewing the purchase order further comprises the step of reviewing the purchase order for conformity with applicable rules and regulations.

13. The sourcing and procurement method of claim 10, wherein managing orders made from a catalog of approved procurement items further comprises the steps of: rejecting the purchase order; and notifying the submitter of the rejection.

14. The sourcing and procurement method of claim 9, wherein the step of invoicing a client for payments made further comprises the steps of: receiving an invoice from a vendor; matching the invoice to corresponding documentation; and approving payment.

15. The sourcing and procurement method of claim 14, wherein the step of invoicing a client for payments made further comprises the step of validating the invoice.

16. The sourcing and procurement method of claim 9, wherein the step of maintaining a catalog further comprises the steps of: developing the catalog; reviewing the catalog for accuracy; and correcting any inaccuracies.

17. The sourcing and procurement method of claim 1, wherein the step of reviewing and reporting performance comprises the steps of: reviewing current outstanding orders; reviewing inventory levels of previously procured items; analyzing the procured items with an assigned budget; reviewing vendor performance with a vendor; and monitoring compliance with approved procurement processes.

18. The sourcing and procurement method of claim 1, further comprising the step of managing the physical flow of goods.

19. The sourcing and procurement method of claim 18, wherein the step of managing the physical flow of goods further comprises the steps of: providing a single conduit between suppliers and purchasers; providing product warehousing services; and providing logistical services.

20. A method for providing a single procurement source for an organization, comprising the steps of:

creating a list of approved procurement items required by the organization;

selecting vendors for developing new sourcing relationships;

developing a strategic overview of the organization's spend profile, supplier base, supplier industry dynamics and cost of ownership models;

analyzing the procurement items, the spend profile, and spend dynamics to determine a segmentation of purchases of the procurement items, where the segmentation of purchases categorizes the procurement items into groups of similar items, each group being supplied by a single vendor;

developing new contractual relationships with the selected vendors based on, at least, a vendor's capabilities and pricing;

creating a centralized catalog of approved procurement items for procurement from the selected vendors;

managing vendor relationships with the selected vendors;

managing the procurement by the organization of approved procurement items from the selected vendors;

reviewing the performance of the selected vendors; and reporting the performance of the selected vendors to the organization.

21. The method of claim 20, further comprising the step of reviewing the sourcing and procurement services for compliance with applicable rules and regulations by a rules and regulations specialist.

22. The method of claim 20, wherein the step of managing the procurement of approved procurement items further comprises the steps of:

managing orders made from a catalog of approved items;

verifying receipt of approved orders;

approving orders by matching an invoice against a corresponding purchase order and a corresponding receiving document and validating that information contained within the invoice, purchase order, and receiving document matches;

paying vendors for approved orders;

invoicing a client for payments made; and maintaining a catalog of approved items.

* * * * *